United States Patent

[11] 3,587,749

| [72] | Inventor | Gerald P. Sauer<br>910 Chelton Parkway, Cherry Hill, N.J.<br>08034 |
|---|---|---|
| [21] | Appl. No. | 715,318 |
| [22] | Filed | Mar. 22, 1968 |
| [45] | Patented | June 28, 1971 |

[54] LAWN EDGER ATTACHMENT FOR A POWER SAW
1 Claim, 4 Drawing Figs.

[52] U.S. Cl............................................................ 172/15,
172/17, 56/25.4, 56/256
[51] Int. Cl........................................................... A01b 45/04
[50] Field of Search............................................ 172/15,
13, 17; 56/25.4, 26.5, 256

[56] References Cited
UNITED STATES PATENTS

| 2,608,043 | 8/1952 | Berdan........................ | 56/256X |
| 2,902,097 | 9/1959 | Cairns......................... | 172/15 |
| 2,932,144 | 4/1960 | Garner et al................ | 56/25.4 |
| 3,191,368 | 6/1965 | Hidalgo...................... | 56/256X |

Primary Examiner—Robert E. Pulfrey
Assistant Examiner—C. Coughenour
Attorney—Anderson, Luedeka, Fitch, Even & Tabin ABSTRACT: An electric power saw has its saw blade replaced with a two side ground cutter blade and is attached to and carried by a wheeled carrier. A shoe on the power saw is attached to a baseplate of the carrier and the shoe and cutter blade are adjustable relative to each other to adjust the blade cutting height. A pivotally mounted handle, by which the carrier may be pushed, carries a switch for stopping and starting the saw electric motor. The carrier baseplate is supported on three wheels for ease of turning and maneuvering.

PATENTED JUN28 1971  3,587,749

Gerald R. Sauer
Inventor

LAWN EDGER ATTACHMENT FOR A POWER SAW

This invention relates to lawn edgers and, more particularly to a lawn edger attachment for an electric power saw.

There have been many different types of power driven lawn edgers previously disclosed. Most have utilized an integral motor or gas engine to drive the edging blade. The cost of these edgers is thus quite high. Contrasted to prior art devices, the present device is relatively inexpensive.

Generally described, without regard to the scope of the invention as defined in the claim, the present device is a hand operated accessory implement, having a steel base plate of bent formation which provides the sole support for a separately attachable electric power saw. A pair of wheels are mounted at the handle or rear end underside of the baseplate and a single wheel is affixed to the fore-end, underside of the baseplate. An upwardly and rearwardly extended handle with grip is attached to the rear of the baseplate, at opposite sides, with intermediate angle brackets. The lower end of the handle is composed of two members forming an inverted Y-shape with ends flattened, the flattened ends being attached to the angle brackets by machine bolt and nut and loosely fitted to permit movement of the handle relative to the baseplate. To the fore-end of the baseplate on the top side is mounted a U-shaped angle bracket. An arched handle supporting member of tubular construction, with ends flattened, is inserted in and attached to the U bracket by round headed pin and push nut fastener. The other end of the supporting member is fastened to the main handle member above its Y portion by a sliding clamp arrangement, thereby permitting adjustment of the main handle member elevation. Near upper end of main handle member and horizontally perpendicular thereto, is attached a secondary stub handle member with grip which provides operator with additional device control. Oppositely spaced hooks are mounted on the main handle member so power saw electric cord may be looped and thereby stowed when device is in use. Electric power is provided for the power saw, in the device, by a male and female plug, inline switch and cord which enters and passes through end of grip on main handle member, emerging from handle near upper end. Two flat headed machine screws with wing nuts are inserted in holes provided on lower part of baseplate for fastening power saw to device.

The primary object of this invention is to provide a simple and inexpensive attachment which can be joined to an electric hand power saw, which has been equipped with a lawn edger blade in lieu of a saw blade, to provide a means of conveyance and control for the saw and thereby provide an excellent lawn edger. Considerably economy in initial equipment cost will be effected by permitting two similar operations to be performed by utilizing a common drive mechanism. Versatility and complete use of the power saw is still retained as it can be readily removed from the lawn edger attachment and used as desired.

A further object is to provide in such a lawn edger attachment a convenient switch for turning the electric power on-and-off without using the power saw on-off switch.

A further object is to provide in such a lawn edger attachment a means for stowing the power saw electric cord and to provide a mating power plug and cord to supply power.

A further object is to provide an effective means for adjusting the height of the handle of the lawn edger attachment.

A further object is to provide an improved means for conveying the lawn edger attachment comprising a pair of rear wheels, properly spaced, and a single front wheel, allowing the device to be used on narrow surfaces such as road curbing.

Other further objects and advantages of my invention will become apparent upon reading the following detailed description taken in conjunction with the accompanying drawings, in which.

Figures 1, 2, 3, 4:
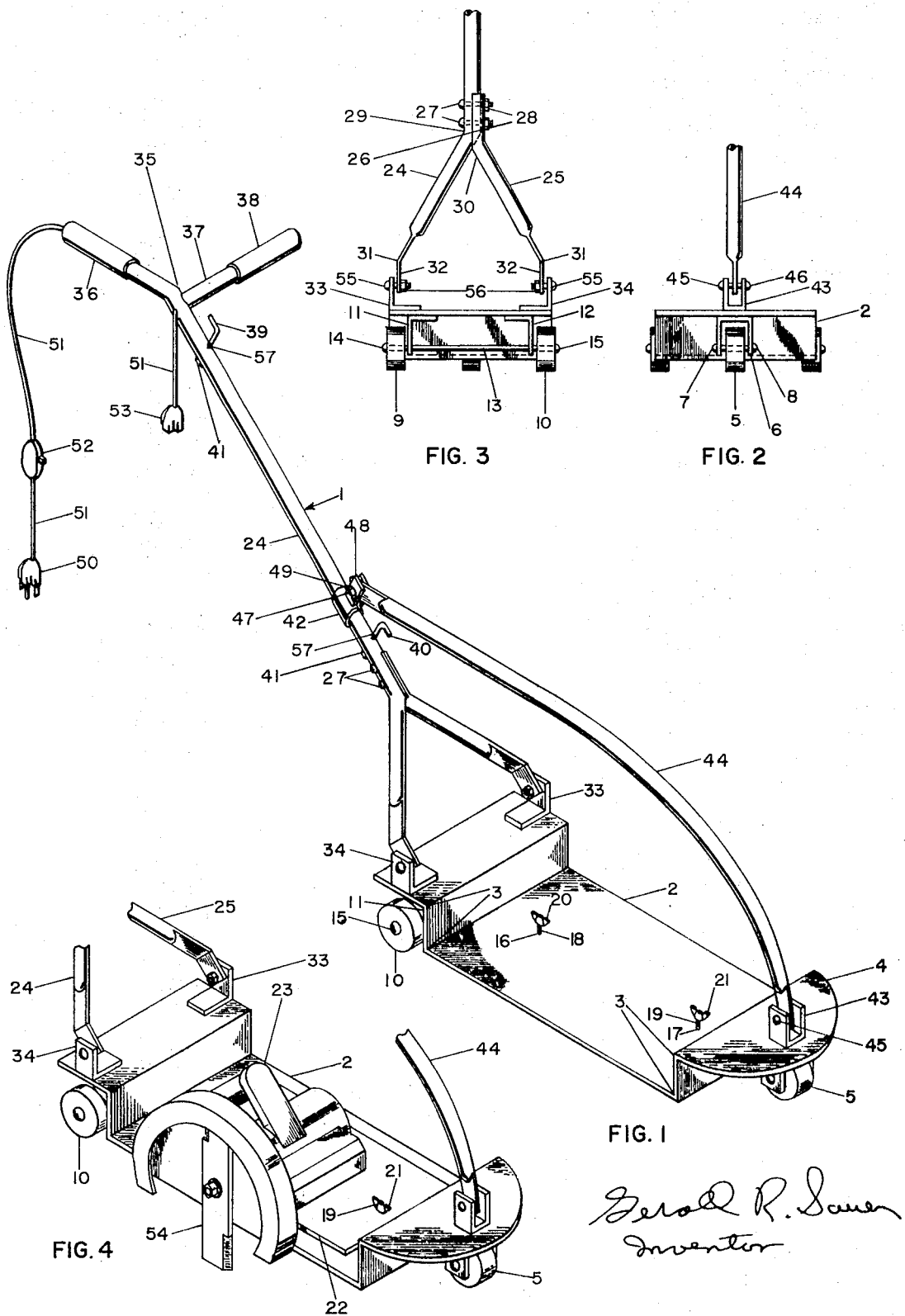
FIG. 1 is a perspective view of a preferred embodiment of my invention.
FIG. 2 is a fragmentary front elevation on an enlarged scale of the lawn edger attachment shown in FIG. 1 with the main handle members and a portion of the supporting member removed for the purposes of clarity.
FIG. 3 is a fragmentary rear elevation on an enlarged scale of the lawn edger attachment shown in FIG. 1 with the supporting member and a portion of the main handle member removed for the purposes of clarity.
FIG. 4 is a perspective view of the lawn edger attachment with the handle and supporting members broken away and with a typical electric hand power saw mounted thereon.

Referring initially to FIG. 1, the lawn edger attachment overall is designated at 1 and comprises a baseplate 2, preferably made from steel plate material. Four transverse, 90° bends are made in the baseplate at points marked 3. The right-hand or front portion 4 of baseplate 2, as viewed in FIG. 1, is semicircular in nature. Baseplate is supported by three fixed, preferably plastic wheels, in triangular configuration when viewed from the top. A single wheel 5, hereinafter referred to as the front wheel 5, is mounted on right-hand portion of baseplate 2, as viewed in FIG. 1 and a pair of wheels 9, 10, hereinafter referred to as rear wheels 9, 10 are mounted on opposite sides of the left-hand portion of baseplate 2.

Referring now to FIG. 2, the single front wheel 5 is mounted in a U-shaped metal bracket 6 by an axle 7, one end of which has a round head. Axle 7 passes through one side of U-shaped bracket 6, through front wheel 5, through other side of U-shaped bracket 6, and is retained therein by push nut fastener 8. U-shaped bracket 6 is attached to underside of baseplate 2, preferably by spot welding.

Referring now to FIG. 3, identical, oppositely placed right angle steel brackets 11, 12 are preferably spot welded to underside of baseplate 2. Rear axle 13 is inserted through rear wheel 9; thence through right angle brackets 11, 12; thence through other rear wheel 10; axle 13 being retained in place by push nut fasteners 14, 15 installed on opposite ends of axle 13. Spacing of the rear wheels 9, 10 is such as to permit the operation of the lawn edger attachment 1 on narrow surfaces, such as standard width road curbing.

On lower portion of baseplate 2, on imaginary, longitudinal centerline, two oppositely placed holes 16, 17 are provided, said holes 16, 17 being countersunk on underside of baseplate 2. Inserted from underside of baseplate 2, in said holes 16, 17 are two standard flat headed machine bolts 18, 19; said bolts 18, 19 being provided with wing nuts 20, 21. Holes 16, 17 in baseplate 2, mate with corresponding holes in shoe 22 of typical electric power saw 23; said bolts 18, 19 being inserted in said holes 16, 17 and mating holes on typical electric power saw 23; wing nuts 20, 21 being threadedly engaged on said bolts 18, 19 thereby affixing typical electric power saw 23 to baseplate 2 of lawn edger attachment 1. The foregoing is best illustrated in FIG. 1 and FIG. 4.

Again referring to FIG. 3, extending upwardly and rearwardly from the top and rear of baseplate 2, are hand operated handle members 24 and 25 of tubular construction. Handle member 25 is shaped at 26 to conform to handle member 24 and is attached thereto by two spaced bolts 27 and nuts 28 passing transversely therethrough. Lower portions of handle members 24, 25 are bent at 29 and 30 to form a symmetrical inverted Y-shape; are also flattened and bent at 31, with flats 32 being parallel to each other and perpendicular to baseplate 2. Identical, oppositely placed right angle steel brackets 33, 34 are preferably spot welded to upper rear side of baseplate 2. Centered holes are provided in vertical leg of said brackets 33, 34 which mate with holes provided on flats 32 on lower handle members 24, 25; said members 24, 25 being attached to said brackets 33, 34 by two bolt 55 and nylon insert nut 56 combinations, threadedly engaged and loosely tightened to permit rotation of said members 24, 25 relative to said brackets 33, 34.

Again referring to FIG. 1, handle member 24 extends upwardly and rearwardly at bent portion 35 and terminates with a plastic or rubber handle grip 36. Near upper end of handle member 24 and horizontally perpendicular thereto is attached a secondary stub handle member 37 which also terminates with a plastic or rubber handle grip 38. Secondary stub handle member 37 is formed to fit cylindrical shape of handle member 24 at point of attachment and is secured thereto, preferably by welding.

Above the Y section and below the bend in handle member 24, two oppositely placed hooks 39, 40 are attached. Said hooks are preferably formed from round steel stock, with one end threaded and with ears 57 projecting from either side above threaded portion. Ears 57 are made by deforming hooks 39, 40. Threaded end of hooks 39, 40 are inserted in holes provided in handle member 24, and retained therein by nuts 41; ears 57 preventing said hooks 39, 40 from turning and sliding through hole in handle member 24. Hooks are for the purpose of stowing, by looping therearound, the electric cord of the power saw when in use.

A sliding clamp 42, consisting preferably of a piece of steel tubing of slightly larger diameter than handle member 24, split longitudinally, with vertically projecting ears 48 on either side of split, is installed on handle member 24 between hooks 39, 40. Only one ear 48 of sliding clamp 42 is visible on drawing, however, concealed ear 48 is identical to that shown and therefore an additional detailed view was considered unnecessary. Upper end of arched handle supporting member 44, with ends flattened in vertical plane, is inserted between ears 48 of sliding clamp 42 and attached thereto by bolt 47 passing through holes in ears 48 and mating hole on flat of said member 44, bolt 47 being retained therein by wing nut 49 threadedly engaged thereon. Again referring to FIG. 2, attached preferably by spot welding, to upper fore part of baseplate 2, on longitudinal centerline is U-shaped bracket 43. Arched handle supporting member 44, is attached to U-shaped bracket 43 by round headed pin 45, passing through one side of said U bracket 43, through said member 44, through other side of said U bracket 43, being retained therein by push nut fastener 46. From the foregoing description it can be seen that loosening wing nut 49, permits sliding clamp 42 to move up or down handle member 24 thus changing elevation of said member 24 relative to the ground.

Again referring to FIG. 1, male grounding type electric plug 50 is connected to end of three wire electric cord 51 which in turn is connected to inline auxiliary electric switch 52, then is passed through grip 36, through handle member 24 and said cord 51 being brought out there from at a point above upper hook 39 and terminated in female grounding type electric plug 53. From the foregoing it will be understood that an extension cord, not shown, leading from a source of electricity, may be employed with the present invention by connecting male electric plug 50 to socket of the extension cord. Also, it will be understood that switch 52 provides a means for turning the power saw 23 off and on without having to turn the switch of the power saw 23 off and on, thus providing a convenience to the operator who can easily reach switch 52 without having to bend down and turn the switch on and off on power saw 23.

Referring now to FIG. 4, in the operation of this device it is to be noted that a conventional edger blade 54 is installed on the power saw 23 in place of a saw blade. Also note that the depth of cut of the device is easily set by use of the height adjustment which is an integral part of all power saws.

From the foregoing description, it will be apparent that a simple, inexpensive and very efficient means is described for providing a lawn edger by using a conventional power saw in conjunction with the attachment of the present invention. It is further apparent that many advantages and features heretofore not present in previous lawn edgers is provided.

Although the invention has been described and illustrated with respect to a preferred embodiment thereof, it is to be understood that it is not to be so limited since changes and modifications may be made therein which are within the full intended scope of this invention as hereinafter claimed.

I claim:

1. A lawn edger comprising a power saw having an electric motor and a two sided edger blade rotatable by said electric motor, an electric cord extending from said electric motor, a baseplate for supporting said power saw, said baseplate being continuous but of irregular construction with a flat front and rear portion, two short vertical sections perpendicular to said front and rear portions, a flat lower section between said vertical sections, two machine screws with wing nuts installed in holes on longitudinal centerline on opposite ends of lower section of said baseplate, being adapted to secure said power saw to said baseplate, a single fixed wheel mounted with U-shaped bracket to underside of front portion of said baseplate, two fixed rear wheels mounted with right angle brackets to underside of rear portion of said baseplate, said wheels being disposed to support said baseplate from the ground and to permit movement across thereof when pushed, a handle of elongated inverted Y-shape, said handle being pivotally attached to upper rear of said baseplate with upstanding right angle brackets, said handle being attached to said brackets by loose fitting screw and nut, being adapted to permit partial rotation of said handle relative to said brackets; an upstanding U-haped bracket mounted on top fore portion of said baseplate; a arched handle supporting member pivotally connected to said U bracket, a split sliding clamp with upstanding ears mounted on said handle above Y portion thereof, upper end of said handle supporting member being flattened and inserted between ears on said clamp, retained therein by wing nut and machine screw, said screw passing through holes provided in ears on said clamp and said handle supporting member, said clamp being adapted to permit positioning of said handle relative to ground; a pair of hooks mounted on said handle for looping cord of the power saw therearound; a stub handle member mounted horizontally to upper end of said handle to improve control of said edger attachment; an electrical wiring system mounted from said handle adjacent the upper end thereof, said system including a plug for making a connection with said cord of the power saw, an additional plug for making a connection with an outside power source of electricity, an electrical switch and leads connecting said plugs and said switch in series whereby means is provided for controlling the flow of electrical current to the power saw.

UNITED STATES PATENT OFFICE
CERTIFICATE OF CORRECTION

Patent No. 3,587,749　　　　　　　Dated June 28, 1971

Inventor(s) Gerald R. Sauer

It is certified that error appears in the above-identified patent and that said Letters Patent are hereby corrected as shown below:

The name of the inventor, "Gerald P. Sauer" should be changed to --Gerald R. Sauer--.

Column 1, line 48, "considerably" should be changed to --considerable.

Signed and sealed this 14th day of December 1971.

(SEAL)
Attest:

EDWARD M. FLETCHER, JR.　　　　ROBERT GOTTSCHALK
Attesting Officer　　　　　　　　Acting Commissioner of Patents